United States Patent Office 3,392,169
Patented July 9, 1968

3,392,169
3,6-DIOXO-2-MORPHOLINE ACETIC ACIDS AND
PROCESS FOR MAKING THEM
Ferdinand B. Zienty, Warson Woods, Mo., assignor to
Monsanto Company, St. Louis, Mo., a corporation of
Delaware
No Drawing. Filed Sept. 2, 1965, Ser. No. 484,738
15 Claims. (Cl. 260—247.2)

ABSTRACT OF THE DISCLOSURE 3,6-dioxo-2-morpholine acetic acids useful as water softeners. The compounds are prepared by reacting maleic anhydride with an alpha amino acid in the presence of an aqueous base.

This invention relates to new polycarboxylic acids and their salts and to the process for preparing the same. More particularly, it relates to morpholinedione carboxylic acids, their ammonium and alkali metal salts and to the process wherein maleic anhydride is reacted with certain amino acids to form the new morpholinedione carboxylic acids.

Maleic anhydride is known to react with various amino acids to produce corresponding N-maleoylamino acids; however, under the conditions heretofore employed, the cyclic morpholinedione carboxylic acids have not been formed.

The morpholinediones, represented by the formula,

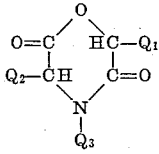

wherein $Q_1$, $Q_2$ and $Q_3$ are each selected from the group consisting of hydrogen, alkyl and phenyl, have been prepared by a number of processes, such as the lactonization of bromoacyl-α-aminoacids, the lactonization of hydroxyaminoacids and the pyrolysis of α-anilinocarboxylic acids. These processes, however, do not produce compounds wherein at least one of $Q_1$ and $Q_2$ is a carboxyl radical; therefore, it has heretofore been unknown to produce a morpholinedione carboxylic acid.

The new morpholinedione carboxylic acids and their salts have been found to have alkaline earth metal sequestering properties. Thus, they are useful as water softeners, as lime soap dispersants and in the fabric dyeing industry as complexing agents for water insoluble metal salts.

It is believed that the discovery of the new group of compounds, that is, the morpholinedione carboxylic acids and their salts, which have alkaline earth metal sequestering properties, and the properties, and the process for preparation of these cyclic acids are significant advances in the art.

It is, therefore, an object of this invention to provide morpholinedione carboxylic acids and their ammonium and alkali metal salts. It is another object of this invention to provide a method for preparing morpholinedione carboxylic acids. It is an additional object of this invention to provide new compounds which are useful as alkaline earth metal sequestering agents. Other objects of this invention will become readily apparent to one skilled in the art from the following detailed description.

The new compounds of this invention include the mono- and dicarboxylic acids of the formula, Formula 1

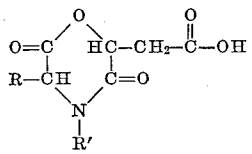

wherein R is selected from the group consisting of $-C_xH_{(2x+1)}$

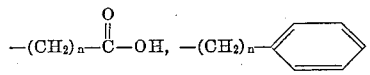

and $-(CH_2)_y-S-(C_yH_{2y+1})$ $n$ is an integer from zero to 4, $x$ is an integer from zero to 6, $y$ is an integer from 1 to 4, and R' is selected from the group consisting of $-C_xH_{(2x+1)}$ and

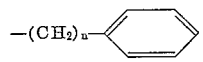

wherein $n$ and $x$ are as defined above. The new compounds of this invention also include the ammonium, sodium, potassium and lithium salts of such acids. In general, these new compounds can be prepared by reacting maleic anhydride with aliphatic monoamino-monocarboxylic acids, aliphatic monoamino-dicarboxylic acids, aromatic derivatives of the monoamino-monocarboxylic acid and certain sulfur containing monoamino-monocarboxylic acids. More particularly the amino acids which are useful in the preparation of the novel compounds of this invention are those which have the amino group on the 2-carbon position. It is believed to be totally unexpected that a cyclic morpholinedione carboxylic acid can be prepared from maleic anhydride and an amino acid in view of the prior art which teaches that the corresponding N-maleoylamino acid is obtained by reacting maleic anhydride with amino acids.

The amino acids which are useful in preparing the novel compounds of this invention can be represented by the formula, Formula 2

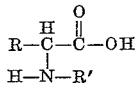

wherein R and R' are as described above.

The monoamino-monocarboxylic acids of the above formula wherein R is hydrogen or alkyl containing from 1 to 6 carbon atoms can be used to produce the corresponding morpholinedione monocarboxylic acids. Compounds which are illustrative of said useful monoamino-monocarboxylic acids include aminoethanoic acid, 2-aminopropanoic acid, 2-amino-3-methylbutanoic acid, 2-aminobutanoic acid, 2-aminopentanoic acid, 2-amino-3-methylpentanoic acid, 2-aminohexanoic acid, 2-aminooctanoic acid, 2-amino-3-ethylhexanoic, 2-amino-3-methylpentanoic acid, N-methyl-2-aminopropanoic acid, N-benzyl-2-aminobutanoic acid, N-propyl-2-aminohexanoic acid, N-hexyl-2-amino-octanoic acid, N-phenethyl-2-aminoheptanoic acid, N-benzyl-aminoethanoic acid, N-phenyl-aminoethanoic acid, N-ethyl-aminoethanoic acid, N-butyl-aminoethanoic acid, N-phenylbutyl-aminoethanoic acid and N-benzyl-2-aminopropanoic acid.

Additionally, certain monoamino-dicarboxylic acids can be used to prepare the corresponding morpholinedione dicarboxylic acids. Those compounds of Formula 2 wherein R is

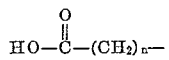

wherein $n$ is an integer from zero to 4, are useful for this purpose. Compounds illustrative of said useful monoaminodicarboxylic acids include 2-aminobutanedioic acid, 2-aminopentanedioic acid, 2-aminohexanedioic acid, 2-amino-3-methylpentanedioic acid, 2-amino-4-methylpentanedioic acid, 2-amino-3,3-dimethylpentanedioic acid, 2-amino-3,3-dimethylbutanedioic acid, 2-aminopropanedioic acid, N-methyl 2-aminopropanedioic acid, N-benzyl 2-aminopropanedioic acid, N-phenethyl 2-aminohexanedioic acid, N-phenylbutyl 2-aminobutanedioic acid, N-hexyl 2-aminohexanedioic acid, N-n-butyl 2-aminobutanedioic acid, N-tert-butyl 2-aminohexanedioic acid, N-methyl 2-aminopropanedioic acid, N-ethyl 2-aminobutanedioic acid and N-isopropyl 2-aminoheptanedioic acid.

Certain phenyl derivatives of monoamino-monocarboxylic acids can be used to produce the corresponding morpholinedione monocarboxylic acids. The useful phenyl derivatives of monoamino-monocarboxylic acids are those amino acids of Formula 2 wherein R is

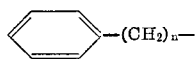

wherein $n$ is an integer from zero to 4. Compounds illustrative of said useful phenyl derivatives of monoamino-monocarboxylic acids include 2-amino-2-phenylpropanoic acid, 2-amino-3-phenylpropanoic acid, 2-amino-4-phenylbutanoic acid, 2-amino-5-phenylpentanoic acid, 2-amino-3-methyl-5-phenylpentanoic acid, 2-amino-3-methyl-3-phenylbutanoic acid, N-phenyl-aminoethanoic acid, N-benzyl-2-amino-3-phenylpropanoic acid, N-ethyl-2-amino-4-phenylbutanoic acid, N-phenylbutyl-2-amino-6-phenylhexanoic acid, N-phenethyl-2-amino-5-phenylpentanoic acid and N-hexyl-2-amino-4-phenylbutanoic acid.

In Formula 2, R can also be $$(C_yH_{2y+1})—S—(CH_2)_y—$$

wherein $y$ is an integer from 1 to 4. These sulfur-containing amino acids will react with maleic anhydride to produce the corresponding sulfur-containing morpholinedione monocarboxylic acids of this invention. Compounds illustrative of said useful sulfur-containing amino acids include 2-amino-4-methylthiobutanoic acid, 2-amino-3-ethylthiopropanoic acid, 2-amino-6-butylthiohexanoic acid, 2-amino-5-tert-butylthiopentanoic acid, 2-amino-3-methylthiopentanoic acid, 2-amino-6-ethylthiohexanoic acid, N-ethyl-2-amino-4-ethylthiobutanoic acid, N-benzyl-2-amino-3-ethylthiopropanoic acid, N-phenylbutyl-2-amino-5-n-butylthiopentanoic acid and N-hexyl-2-amino-6-methylthiohexanoic acid.

To prepare the novel morpholinedione acids of this invention, said useful amino acids are reacted with maleic anhydride in the presence of certain aqueous bases and under controlled temperature conditions. Thereafter, the reaction product of said amino acid and maleic anhydride is acidified to a controlled pH level.

The bases which have been found to be useful in preparing the novel acids of this invention are the alkali metal and ammonium hydroxides; that is, ammonium hydroxide, sodium hydroxide, potassium hydroxide, lithium hydroxide and the like. Although cesium, lithium and rubidium hydroxides can be used as the base in the practice of this invention, these compounds are relatively expensive and are generally not preferred. Conversely, ammonium hydroxide, sodium hydroxide and potassium hydroxide are readily available and relatively inexpensive, and are accordingly preferred.

A wide range of molar ratios of the base to the amino acid can be used and still produce at least some morpholinedione carboxylic acid; however, it is generally preferred when using monocarboxylic amino acids to approximate a base to acid ratio of about 2:1 to thereby maximize the yield of morpholinedione monocarboxylic acid. Similarly, when using a dicarboxylic amino acid, it is preferred to use a base to acid ratio of about 3:1 to maximize the yield of morpholinedione dicarboxylic acid.

The process of this invention is carried out in the liquid phase. However, it is not limited by the order of addition of the reactants and the base. Generaly, it is preferred to dissolve the maleic anhydride in water, and then add the amino acid and base to this solution. For ease of handling, water solutions of the bases are preferred.

The molar ratio of maleic anhydride to the appropriate amino acid is not critical. Thus, molar ratios of maleic anhydride to amino acid from 1:1000 to 1000:1 can be used and still produce some of the compounds of this invention. It is, however, preferred to approximate equal molar ratios of maleic anhydride to amino acid to maximize the yield of morpholinedione carboxylic acid.

It is desirable in the practice of this invention to control the temperature of the reaction medium; that is, the solution of maleic anhydride, amino acid and base should be at a temperature of from about 65° C. to about 115° C. Temperatures below about 65° C. result in the production of only minor amounts of the novel compounds. Temperatures above about 115° C. cause side reactions. It has been found that reaction temperatures of from about 85° C. to about 100° C. maximize the yield of the morpholinedione carboxylic acids; therefore, it is the preferred temperature range. It is also preferred to agitate the solution of the reactants and base to permit proper temperature control.

After completion of the reaction of maleic anhydride and the amino acid, the reaction product is acidified to a pH of below about 3.0 to produce the morpholinedione carboxylic acid. To insure maximum conversion to the desired acid, it is preferred to acidify to a pH of from about 2.5 to about 1.2. In general, any inorganic acid which will acidify the reaction mass to the proper pH can be used, although it is preferred to use hydrochloric acid or sulfuric acid because of their relatively low cost and ready availability. Some morpholinedione carboxylic acids thus produced are easily separated from the other components of the reaction mixture since they are insoluble therein. Others are isolated by concentration or evaporation of the reaction mixture followed by recrystallization. Any conventional means of separating solids from liquids can be used to isolate the morpholinedione carboxylic acid. The morpholinedione carboxylic acids, after separation from such other components, can easily be converted to the ammonium and alkali metal salts by reaction with appropriate base.

It has also been discovered that upon reacting the morpholinedione carboxylic acids of this invention with a molar excess of the foregoing bases other new compounds are formed. That is, when more than one mole of base per mole of morpholinedione monocarboxylic acid and when more than two moles of base per morpholinedione dicarboxylic acid are reacted the novel compounds, represented by the following formula, are formed:

Formula 3

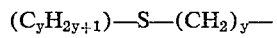

wherein R″ is selected from the group consisting of $—C_xH_{(2x+1)}$, $—(CH_2)_n—COOM$,

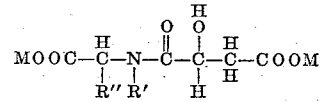

and $—(CH_2)_y—S—(C_yH_{2y+1})$, M is selected from the group consisting of ammonium, sodium, potasisum and lithium, and R′, $n$, $x$ and $y$ are as given in Formula 1. These novel compounds also have alkaline earth sequestering properties; therefore, when using the morpholinedione carboxylic acids as sequestering agents, pH control is not critical in achieving effective sequestering action.

To more fully explain and described the subject invention, the following nonlimiting examples are presented. All parts, proportions and percentages are by weight unless otherwise indicated.

Example 1

About 98 parts of maleic anhydride are dissolved in about 750 parts of water, and the solution is charged into a conventional reaction vessel equipped with an agitator and a heating and cooling coil. The water solution of maleic acid is heated to about 65° C., and about 192 parts of a 28% aqueous ammonia solution and about 133 parts of 2-aminobutanedioic acid are added. While agitating, the solution is heated at about 90 to 95° C. for about 20 hours.

The reaction material is cooled to about 25° C., about 300 parts of 37% hydrochloric acid is added, and the pH is measured to be about 1.5. A crystalline material is separated from the other components by filtration, washed with water and dried at 55° C. The colorless crystalline solid has a melting point of 208–209° C. It is soluble in dimethylsulfoxide, relatively insoluble in methanol, acetone, toluene, dioxane and molten maleic anhydride, and slightly soluble in dimethylformamide.

Analytical determination of element and water content is compared with the theoretical element and water content of 2,5-dioxo-3,6-morpholinediacetic acid (empirical formula, $C_8H_9NO_7 \cdot 2H_2O$) in the table below.

| Compound or Element | Theoretical (percent) | Actual (percent) |
|---|---|---|
| Carbon | 35.96 | 36.02 |
| Hydrogen | 4.90 | 4.93 |
| Nitrogen | 5.24 | 5.05 |
| Water | 13.48 | 13.0 |

Additional analyses by nuclear magnetic resonance, X-ray diffraction and infrared absorption further identify the compound to be the polycarboxylic acid, 2,5-dioxo-3,6-morpholinediacetic acid.

When the foregoing preparation is carried out with the product dried at about 110° C. instead of 55° C., the monohydrate, $C_8H_9NO_7 \cdot H_2O$, is formed and is identified by similar analytical methods.

Example 2

About 98 parts of maleic anhydride and about 750 parts of water are charged into a conventional reaction vessel. The aqueous solution of maleic acid is heated to about 85° C., and about 75 parts of aminoethanoic acid and about 80 parts of a 50% aqueous sodium hydroxide solution are added. The reaction vessel contents are held at from about 85° C. to about 100° C. for 10 hours. After cooling the contents of the reaction vessel to about 25° C., about 100 parts of 98% sulfuric acid are added to lower the pH of the reaction material to about 1.3.

The acidified solution is evaporated, producing a crystalline material which is separated from the other components by crystallization techniques. By using the analytical methods of Example 1, the crystalline material is identified as 3,6-dioxo-2-morpholineacetic acid, having an empirical formula, $C_6H_7O_5N$. The formula and structure are supported by analyses, including nuclear magnetic spectra.

The 3,6-dioxo-2-morpholineacetic acid is reacted with an equimolar quantity of aqueous potassium hydroxide at a temperature of about 35° C. to form the monopotassium salt of 3,6-dioxo-2-morpholineacetic acid. The monopotassium salt of 3,6-dioxo-2-morpholineacetic acid reacts with calicum salts in an aqueous medium to produce a water soluble calcium complex. The monopotassium salt of the 3,6-dioxo-2-morpholineacetic acid is therefore useful as a calcium sequestering agent in water treating, and as an additive in detergent and/or soap manufacture.

Example 3

About 98 parts of maleic anhydride and about 400 parts of water are charged into a conventional reaction vessel and heated to about 70° C. About 165 parts of 2-amino-3-phenylpropanoic acid and about 114 parts of a 30% aqueous solution of ammonia are added to the aqueous maleic acid solution. The solution is heated to about 90° C. and held at that temperature for about 20 hours. After cooling the reaction mass to about 30° C., about 200 parts of a 36% solution of hydrochloric acid is added. The pH of the reaction mass measures about 1.5 after the addition. The crystalline material formed during the acidification is separated from the other components by a conventional centrifuge. Using elemental analysis, nuclear magnetic resonance analysis and infrared absorption analysis the material is identified as 3,6-dioxo-5-benzyl-2-morpholineacetic acid.

Following essentially the same procedure as in Examples 1, 2 and 3, other morpholinedione carboxylic acids are prepared. Selected nonlimiting examples are shown in the following table. In each example the amino acid shown is reacted with a substantially equimolar quantity of maleic anhyride. When a monocarboxylic amino acid is used, approximately two moles of the base are used per mole of amino acid. When a dicarboxylic amino acid is used, about 3 moles of the base are added per mole of amino acid. Similarly, the molar quantities of acids used in the acidification step are about equal to the molar quantities of base used.

TABLE 1

| Example | Amino Acid | Base | Acid | Morpholinedione Carboxylic Acid |
|---|---|---|---|---|
| 4 | 2-aminopentanedioic | Ammonium hydroxide | Sulfuric | 3,6-dioxo-5-carboxyethyl-2-morpholineacetic acid. |
| 5 | 2-amino-3-methylbutanoic | do | Hydrochloric | 3,6-dioxo-5-isopropyl-2-morpholineacetic acid. |
| 6 | 2-aminohexanoic | Sodium hydroxide | Sulfuric | 3,6-dioxo-5-butyl-2-morpholineacetic acid. |
| 7 | 2-amino-3-methylpentanoic | Potassium hydroxide | Hydrochloric | 3,6-dioxo-5-sec-butyl-2-morpholineacetic acid. |
| 8 | 2-amino-4-methylthiobutanoic | Ammonium hydroxide | do | 3,6-dioxo-5-methylthioethyl-2-morpholineacetic acid. |
| 9 | 2-aminohexanedioic | Sodium hydroxide | do | 3,6-dioxo-5-carboxylpropyl-2-morpholineacetic acid. |
| 10 | 2-amino-5-phenylpentanoic | Ammonium hydroxide | Sulfuric | 3,6-dioxo-5-phenpropyl-2-morpholineacetic acid. |
| 11 | N-ethyl 2-aminoethanoic | do | do | 3,6-dioxo-4-ethyl-2-morpholineacetic acid. |
| 12 | N-benzyl 2-aminoethanoic | Potassium hydroxide | Hydrochloric | 3,6-dioxo-4-benzyl-2-morpholineacetic acid. |
| 13 | N-methyl 2-amino-3-methylthiopentanoic | Sodium hydroxide | do | 3,6-dioxo-4-methyl-5-methylthiopropyl-2-morpholineacetic acid. |
| 14 | 2-amino-6-butylthiohexanoic | do | Sulfuric | 3,6-dioxo-5-butylthiobutyl-2-morpholineacetic acid. |
| 15 | N-ethyl-2-aminobutanedioic | Ammonium hydroxide | do | 3,6-dioxo-4-ethyl-2,5-morpholinediacetic acid. |
| 16 | 2-amino-3-phenylpropanoic | do | Hydrochloric | 3,6-dioxo-5-benzyl-2-morpholineacetic acid. |
| 17 | 2-amino-5-phenyl-pentanoic | do | do | 3,6-dioxo-5-phenylpropyl-2-morpholineacetic acid. |
| 18 | N-benzyl 2-amino-3-phenylpropanoic | do | do | 3,6-dioxo-4,5-dibenzyl-2-morpholineacetic acid. |

The compounds of Table 1 are reacted with appropriate molar amounts of base to obtain the salts of the morpholinedione carboxylic acids or if desired reacted with a molar excess of base to obtain the corresponding salts of Formula 3.

The morpholinedione carboxylic acids and their ammonium, sodium, potassium and lithium salts exhibit alkaline earth sequestering properties. For example, the compound of Example 1 is effective in keeping alkaline earth salts in solution in concentrations as low as 0.05%. In a series of tests, the compound of Example 1, when added to tap water having alkaline earth salts, enabled each of the detergents, sodium triisobutenyl succinate, and dodecyl 3-sodium sulfobutyrate to exhibit good wetting properties. The same detergents, without the addition of the compound of Example 1, exhibited poor wetting properties in tap water and good wetting properties is distilled water. When calcium chloride is present in water in amounts of about 0.5% by weight, the concentration of the compound of Example 2 is increased up to about 0.50% by weight to achieve good wetting properties of the detergent. Other compounds of this invention, that is, the other morpholinedione carboxylic acids and their salts, as well as the compounds of Formula 3 when used in similar concentrations and conditions, exhibit similar alkaline earth sequestering capabilities.

While the invention has been described herein with regard to certain specific embodiments, it is not so limited. It is to be understood that variations and modifications thereof may be made by those skilled in the art without departing from the spirit and scope of the invention.

What is claimed is:

1. A composition of matter selected from the group consisting of compounds of the formula

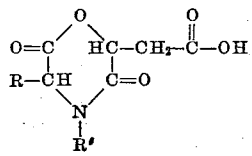

wherein R is selected from the group consisting of $-C_xH_{(2x+1)}$, $-(CH_2)_nCOOH$,

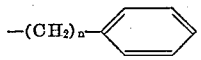

and $-(CH_2)_y-S-C_yH_{(2y+1)}$, $n$ is an integer from zero to 4, $x$ is an integer from zero to 6, $y$ is an integer from 1 to 4, and R' is selected from the group consisting of $-C_xH_{(2x+1)}$ and

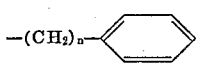

wherein $n$ and $x$ are as defined above, and the ammonium, sodium, potassium and lithium salts of such compounds.

2. A compound of claim 1 wherein R and R' are each $-C_xH_{(2x+1)}$.

3. A compound of claim 1 wherein R is $$-(CH_2)_nCOOH$$

and R' is $-C_xH_{(2x+1)}$.

4. A compound of claim 1 wherein R is

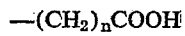

and R' is $-C_xH_{(2x+1)}$.

5. A compound of claim 1 wherein R is $-C_xH_{(2x+1)}$ and R' is

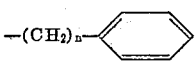

6. A compound of claim 1 wherein R is $$-(CH_2)_nCOOH$$

and R' is

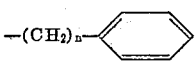

7. A compound of claim 1 wherein R and R' are each

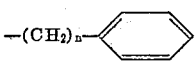

8. The compound of claim 1 wherein R is $-CH_2COOH$ and R' is hydrogen.

9. A process comprising (a) reacting maleic anhydride with an amino acid of the formula $$R-\overset{H}{\underset{HN-R'}{C}}-\overset{O}{\underset{}{C}}-OH$$

wherein R is selected from the group consisting of $C_xH_{2x+1}$, $(CH_2)_n-COOH$

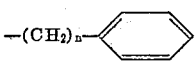

and $(CH_2)_y-S-C_yH_{2y+1}$, wherein $y$ is an integer from 1 to 4, $n$ is an integer from zero to 4, $x$ is an integer from zero to 6 and R' is selected from the group consisting of $C_xH_{2x+1}$ and

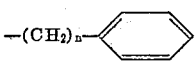

wherein $n$ and $x$ are as defined above, in the presence of an aqueous base selected from the group consisting of ammonium hydroxide, sodium hydroxide and potassium hydroxide, and with a temperature above about 65° C. but below about 115° C. and (b) subsequently acidifying the product of said reaction to a pH of below about 3.0.

10. The process of claim 9 wherein said reaction product is acidified to a pH of from about 2.5 to about 1.2.

11. The process of claim 9 wherein said temperature is from about 85° C. to about 100° C.

12. The process of claim 11 wherein in said amino acid R and R' are each $-C_xH_{(2x+1)}$.

13. The process of claim 11 wherein in said amino acid R is $-(CH_2)_nCOOH$ and R' is $-C_xH_{(2x+1)}$.

14. The process of claim 11 wherein in said amino acid R is

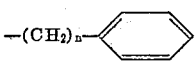

and R' is $-C_x2_{x+1}$.

15. The process of claim 11 wherein in said amino acid R is $-C_x2_{x+1}$ and R' is

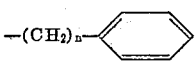

References Cited

UNITED STATES PATENTS 2,948,723   8/1960   Blicking _____ 260—247.7

NICHOLAS S. RIZZO, Primary Examiner.

JOSE TOVAR, Assistant Examiner.